United States Patent [19]

Gent

[11] Patent Number: 4,618,451

[45] Date of Patent: Oct. 21, 1986

[54] SYNTHESIS GAS

[75] Inventor: Colin W. Gent, Yarm, England

[73] Assignee: Imperial Chemical Industries PLC, London, England

[21] Appl. No.: 594,014

[22] Filed: Mar. 27, 1984

[30] Foreign Application Priority Data

Apr. 6, 1983 [GB] United Kingdom ............... 8309359

[51] Int. Cl.$^4$ .............................................. C01B 3/38
[52] U.S. Cl. .................................................... 252/373
[58] Field of Search ................. 252/373; 518/703, 704

[56] References Cited

U.S. PATENT DOCUMENTS

| 2,546,606 | 3/1951 | Mayland | 252/373 |
|---|---|---|---|
| 2,655,442 | 10/1953 | Mayland | 252/373 |
| 3,477,824 | 11/1969 | Reed | 585/924 |
| 3,576,603 | 4/1971 | Smith et al. | 252/373 |
| 3,784,364 | 1/1974 | Slater et al. | 252/373 |
| 3,972,958 | 8/1976 | Garwood et al. | 252/373 |
| 4,065,483 | 12/1977 | Pinto | 518/704 |
| 4,089,941 | 5/1978 | Villemin | 252/373 |
| 4,233,187 | 11/1980 | Atwood et al. | 252/373 |
| 4,432,207 | 2/1984 | Davis et al. | 60/723 |
| 4,443,560 | 4/1984 | LeBlanc, Jr. et al. | 518/704 |

FOREIGN PATENT DOCUMENTS

| 1159826 | 7/1969 | United Kingdom . |
| 1360988 | 7/1974 | United Kingdom . |
| 1370902 | 10/1974 | United Kingdom . |
| 1500745 | 2/1978 | United Kingdom . |
| 2111602 | 7/1983 | United Kingdom . |

Primary Examiner—Natalie Trousof
Assistant Examiner—Bruce D. Gray
Attorney, Agent, or Firm—Cushman, Darby & Cushman

[57] ABSTRACT

Synthesis gas is produced by reacting a hydrocarbon feedstock with oxygen to give a hot gas containing $H_2$ and CO, injecting into the resulting hot gas a hydrocarbon and possibly steam and/or $CO_2$ and reacting the resulting mixture adiabatically over a steam reforming catalyst. These steps are carried out preferably in a reactor of substantially uniform cross section such as a gas turbine combustor.

5 Claims, 1 Drawing Figure

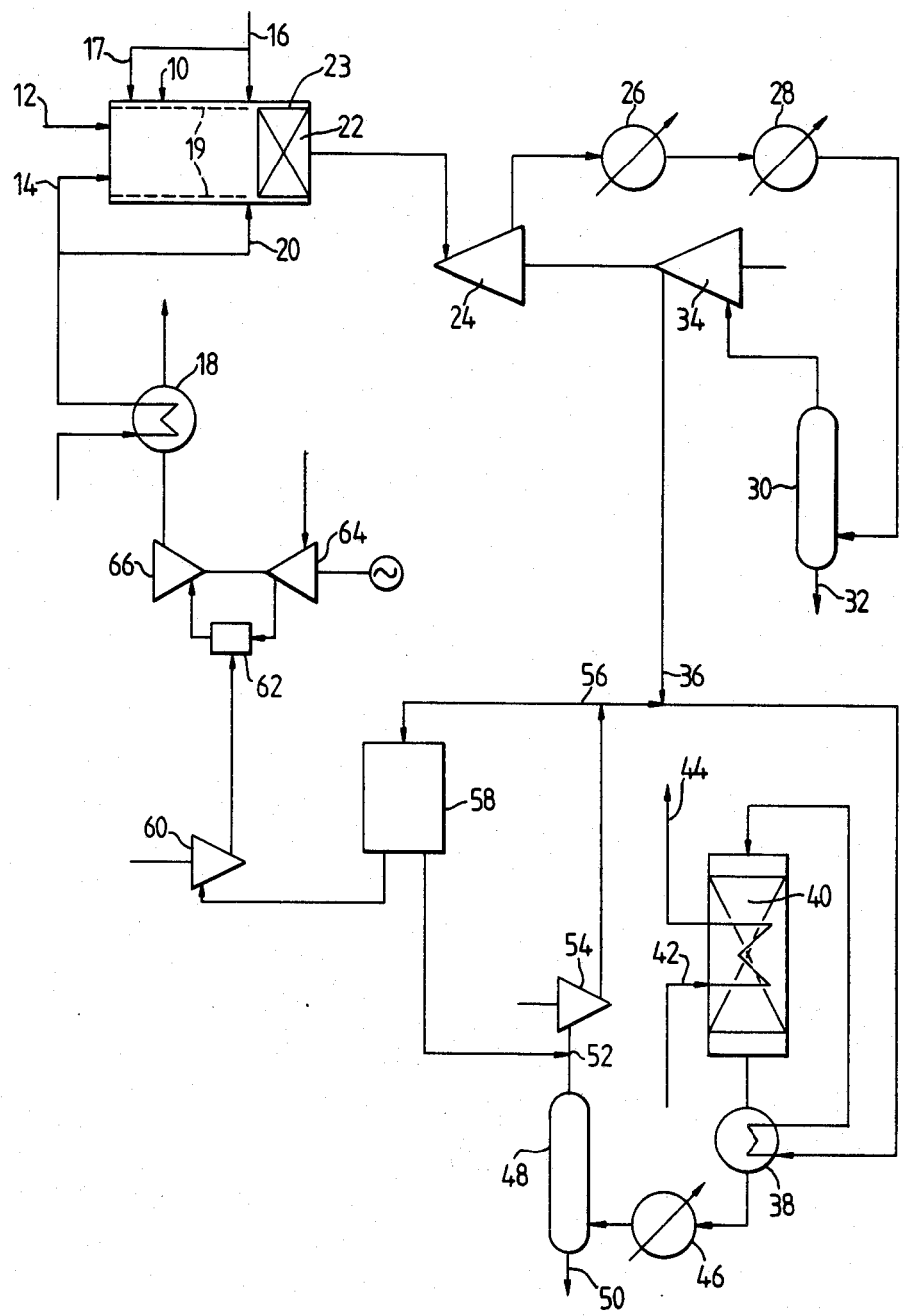

SYNTHESIS GAS

This invention relates to synthesis gas containing hydrogen and carbon monoxide and/or dioxide and in particular to a process and reactor producing it by partial oxidation of a hydrocarbon feedstock, and to synthesis processes using such gas.

Processes for producing synthesis gas from a hydrocarbon feedstock commonly involve endothermic reaction thereof with steam over an externally heated catalyst or reaction of such a feedstock with oxygen an optionally steam in an adiabatic vessel that may or may not contain a catalyst. Especially when the synthesis gas is to be used for producing ammonia, the product of reaction over the externally heated catalyst can be reacted with air to effect conversion of hydrocarbon not converted in the externally heated stage and to introduce nitrogen. Analogously oxygen can be used at the second stage if a nitrogen-free synthesis gas is required. A converse sequence, involving conversion of hydrocarbon in a step following initial reaction with oxygen appears, however, to have been considered mainly as a route to gases of raised heating value rather than synthesis gas.

In UK patent application 2,111,602 published on July 6, 1983 there is described a process for producing carbon monoxide and hydrogen for the production of methanol by burning a hydrocarbon fuel and oxygen in the presence of steam in proportions producing a mixture containing carbon monoxide and hydrogen in the combustor of a gas turbine power plant, recovering power from the gas turbine and also from steam generated by heat recovery from the gas turbine effluent, and finally removing water and carbon dioxide.

We have now realised that the above-mentioned converse sequence can be performed advantageously in a suitably designed combustor and makes possible the production of synthesis gas with less carbon dioxide removal than in the process of 2,111,602 and, in favourable conditions, no carbon dioxide removal. Our process can provide a given output of synthesis gas in plants much smaller than has been needed for the conventional processes described above.

According to the invention a continuous process of producing such a synthesis gas comprises the steps of
 (a) reacting a hydrocarbon feedstock with oxygen at superatmospheric pressure, the proportion of oxygen being less than sufficient for complete combustion, whereby to produce a hot gas containing hydrogen and carbon monoxide;
 (b) injecting into the hot gas a hydrocarbon and possibly also steam and/or carbon dioxide;
 (c) reacting the resulting gas mixture adiabatically over a steam reforming catalyst, whereby to increase the ratio of hydrogen to carbon oxides and to decrease the temperature of the gas mixture.

After step (c) the gas is cooled further with energy recovery, preferably by expansion in an engine but possibly by steam raising and/or steam superheating, whereafter there may follow lower grade heat recoveries, as in conventional synthesis gas manufacturing. There may be conventional steps of steam removal and, where appropriate, of composition adjustment.

The hydrocarbon feedstock is preferably substantially free of catalyst poisons such as sulphur, in order to avoid possible deactivation of the catalyst in step (c) and to make it unnecessary to purify the gas made by the process, and thus it has a boiling point preferably under 220° C. Normally gaseous hydrocarbons, especially natural gas, most suitably containing less than 1% v/v of hydrocarbons other than methane are very suitable. The hydrocarbon feedstocks used in steps (a) and (b) can be the same or different. If desired, an available feedstock can be treated to separate hydrocarbons other than methane to step (a). Higher hydrocarbons, especially if normally liquid, can be converted to a methane rich gas by reaction with steam and/or hydrogen, before being fed to the process.

The proportion of oxygen to hydrocarbon should be sufficient to avoid by-product soot formation: there can, however, be formation of carbon in small quantities and in a finely divided state such that is does not constitute a by product and does not adversely affect any downstream engine or processing steps. In this way step (a) preferably differs from many commonly used processes of oxygen gasification of hydrocarbons. There may be present for example steam or nitrogen or recycled product gas to act as a temperature modifier; such components also affect the proportion of oxygen required to avoid soot formation. Typically the gas leaving step (a) is at 2000° to 2300° F. (1093° to 1260° C.) especially 2100° to 2200° F. (1149° to 1204° C.); such gas exit temperatures are inconveniently high for immediate heat recovery, for example by passage through an expansion enginer or boiler.

Step (a) is carried out preferably by reacting the hydrocarbon feedstock and oxygen, with possibly a minor proportion of steam, in a combustion zone of substantially uniform cross section, which preferably is bounded by, in order, a layer of shielding gas, a perforated inner shell through which such shielding gas is fed, then a further layer of shielding gas, than an external containing wall. For the process of the invention the shielding gas is preferably steam. In this way the reaction zone preferably differs from the secondary reformer in common use, which normally tapers outwards just beyond the hydrocarbon/oxygen reaction zone, and is refractory lined.

Compared with the combustion zone, the cross-sectional area is preferably not greater by 100% or smaller by more than 50% at the downstream end of the zone in which step (c) takes place. In this way it is possible to contact the reactants, which are highly viscous at the temperatures and pressures of operation, more uniformly with the catalyst than in secondary reformers. As a result a large throughput can be achieved in plant of small dimensions. Typically the dynamic viscosity of the reactants entering the the catalyst is in the range 3 to $10 \times 10^{-5}$ m$^2$sec$^{-1}$.

The pressure at the outlet of step (c) is typically in the range 5–50 bar abs; the pressure, temperature and steam feed rate are chosen typically to produce a gas containing 0.5 to 2.5% v/v of methane on a dry basis.

The reaction is step (a) is normally homogeneous but can be catalytic or a combination of homogeneous and catalytic depending on the choice of temperature and availability of a sufficiently refractory catalyst.

In steps (b), (c) the injected hydrocarbon undergoes one or both of these strongly endothermic reactions:

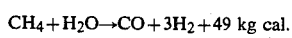

$CH_4 + H_2O \rightarrow CO + 3H_2 + 49$ kg cal.

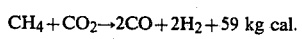

$CH_4 + CO_2 \rightarrow 2CO + 2H_2 + 59$ kg cal.

There is no secondary air addition and at most a trace of unreacted oxygen from step (a). As a result the gas from step (a) is cooled to a temperature typically in the range 750° to 950° or up to 1050° C. and enriched in synthesis reactants. The catalyst in step (c) is one or more Group VIII metals on a heat resistant support. Conventional random packed ceramic supported catalyst pieces, as used for example in secondary reformers, can be used but, since these apply a significant pressure drop to the gas, it is preferred to use a monolithic catalyst having through-passages generally parallel to the direction of reactants flow. A suitable monolithic catalyst has a geometric surface area in the range 150 to 7000, especially 600 to $3000^{2-3}$ mm, corresponding approximately (in the latter case) to 4 to 60 passages per cm.

The monolith can be ceramic, having as its structural material cordierite, mullite, spodumene, alumina, calcium aluminate or zirconia or cordierites modified with manganese oxide or titania. Since the process is to be operated continuously, the monolith is not subject to the frequent temperature changes and mechanical vibrations encountered in the process for which they were primarily designed, namely automotive exhaust gas treatment. Thus the need for materials of low thermal expansion and low heat capacity, which affect catalyst monoliths to be used in automobile exhaust gas treatment, is not present, and the support material can be chosen on the basis of catalytic requirements. It is expected that high purity (over 99%) alumina or calcium aluminate will be preferred.

Alternatively the monolith can be made structurally of a high temperature alloy, examples of which set out in our published European application 21736. Alloy monoliths can readily provide a geometric surface in the upper parts of the ranges stated above, but are also suitable for the lower areas. Because of the higher pressure drop of the highest surface monoliths, it is preferred to use them in at most a part of the catalytic zone.

If desired, an alloy monolith can be used downstream of a ceramic monolith, so that reaction over the ceramic monolith decreases the temperature to a level readily tolerated by the alloy monolith, whereafter further endothermic reaction takes place at high intensity on the large surface of the alloy monolith.

As an alternative to monolithic catalyst or in a bed downstream of a monolithic catalyst, a catalyst in the form of random packed units each affording gas flow in at least 2 mutually transverse directions within its boundaries can be used, as described in our European published application 82614.

If a ceramic supported catalyst is used, it is preferably of the type having a low-surface very refractory primary support carrying a coating of an adsorptive secondary support. If an alloy supported catalyst is used, it normally carries such a secondary support, which also assists in protecting the alloy from damage by the hot gases.

Whichever type of catalyst is used, its active material is preferably one or more of nickel, cobalt, platinum group metals and chromium oxide. Different active materials can be used at different parts of the catalytic zone. A typical catalyst contains 1-10, especially 2-6% w/w of nickel or cobalt calculated as equivalent NiO and half to four times the quantity of alumina, on a refractory primary support.

Steps (a), (b) and (c) are preferably carried out in the same reactor, which conveniently is an adaptation of a combustor of the type used to feed a gas turbine. Such a reactor per se constituting a further feature of the invention comprises an outer shell having at least an inlet zone and a combustion zone, means to feed at least a fuel and oxygen into the inlet zone, means to remove combustion products from the combustion zone and shielding gas injection means to prevent overheating of the outer shell, and is characterised by having also a zone for catalyst within the shell downstream of the combustion zone amd means to inject a hydrocarbon and steam and/or carbon dioxide upstream of the catalyst zone. The injection means preferably includes a perforated inner shell as described herein.

The process is especially suitable for making methanol synthesis gas. If the hydrocarbon feedstock contains at least 3.5 hydrogen atoms per carbon atom the process is especially simple since the hydrogen to carbon oxides ratio of the gas, as expressed by "R" where $$R = \frac{H_2 - CO_2}{CO + CO_2}$$

can be brought to a value over 1.3, especially into the range 1.5-2.22 such that it can be used for methanol synthesis without removal of carbon oxide before it passes to the methanol synthesis step. In such a process the value of R is more conveniently in the range 1.6-1.9 in the gas leaving step (c), but is brought to 2.0 by hydrogen recovery from a side stream, taken preferably from reacted synthesis gas. Such hydrogen recovery is in any event desirable if the gas leaving step (c) contains methane at over about 0.5% v/v as it conveniently does. Although such hydrogen recovery could be avoided by ensuring more complete reaction in steps (a) to (c), this would involve a greater comsumption of oxygen and add costs greater than those of the hydrogen recovery.

In a typical methanol synthesis step the pressure is in the range 20-120 bar abs., temperature 160°-320° especially 200°-300° C. and the catalyst contains metallic copper, zinc oxide and one or more other metal oxides, especially of aluminium, chromium or vanadium.

If the synthesis gas is to be used for making organic c compounds containing less hydrogen per carbon atom than the methanol, or for making dimethyl ether, such that for stoichiometry R should be less than 2.0, for example about 1.0, then H to C ratio of the starting hydrocarbon can be less than 3.5. Generally, however, carbon dioxide will be needed in such a process and can be fed to step (b) or with combustor moderating gas or shielding gas.

If the synthesis gas is to be converted to hydrogen-rich gas it can be subjected to conventional steps of shift, carbon dioxide removal and methanation. If ammonia synthesis gas is to be produced, similar steps are carried out, but nitrogen is added, for example by having nitrogen present in step (a) or adding gaseous nitrogen downstream of step (c). If desired, final purification and nitrogen addition can be effected by washing the gas with liquid nitrogen. As an alternative to such conventional sequences, a sequence involving adsorptive purification can be used.

One preferred form of the invention is shown as a flowsheet in the accompanying drawing.

Combustor 10 is fed with substantially pure oxygen 12 from an air separation plant (not shown) and primary methane 14, which has been preheated at 18 in heat exchange with a hot gas to be described. A flame is formed at the inlet zone of combustor 10. Into the resulting hot gas are fed steam 16 and secondary methane 20; a further steam flow 17 is fed around and also through the perforations of combustor under shell 19 and becomes mixed with steam 16 and secondary methane 20. The mixture passes through steam reforming catalyst 22 spaced from the combustor walls in inner shell portion 23. In catalyst 22 the reaction $$CH_4 + H_2O \rightarrow CO + 3H_2$$

takes place, resulting in substantial cooling, to a temperature at which the gas can be fed to expansion turbine 24. Here it undergoes further cooling, with power recovery to be described. High grade heat (superheating, then generation of medium pressure steam, then boiler feed water heating) is recovered at 26, followed by low grade heat recovery and cooling to below dew-point at 28. Liquid water is separated in catchpot 30 and passed out at 32 to a purification plant (now shown) and thence to re-use as boiler feed water. The resulting gas of low water content is compressed to methanol synthesis pressure in compressor 34, driven by expansion turbine 24 mentioned above. At 36 it is mixed with recycle synthesis gas to be described and in feed/effluent heat exchanger 38 heated to methanol synthesis inlet temperature, at which it enters the catalyst bed 40 of the methanol synthesis reactor. The reactor is of the steam-raising type, in which water is fed in at 42, circulated through tubes in the catalyst bed or through a shell surrounding tubes containing catalyst, and therein boiled and passed out at 44 to a steam drum not shown. Reacted gas leaving catalyst bed 40 is passed out of the reactor into the hot side of feed/effluent heat exchanger 38, thence into cooler 46 and into catchpot 48, in which liquid methanol is separated and run off at 50 to a distillation (not shown). Unreacted gas passed out overhead from catchpot 48 is united at 52 with a hydrogen-rich stream to be described and fed to the inlet of circulating pump 54, in which its pressure is increased by 5-10%. At 56 the compressed gas is divided into (a) the recycle stream previously mentioned at point 36 and (b) a hydrogen enrichment stream, which is fed to separation unit 58. Unit 58 includes usually a gas drying bed and can operate on the basis of for example cryogenic fractionation, selective adsorption, membrane diffusion or selective solvent action. The hydrogen rich fraction is fed to point 52. The remaining fraction, comprising mainly methane, carbon monoxide and carbon dioxide, with possibly also nitrogen and noble gases originally present as impurities in the starting methane, is compressed at 60, mixed at 62 with hot air from compressor 64 and expanded in turbine 66, which drives air compressor 64 and also an alternator powering electric drives of pump 54 and compressor 60. The hot effluent from turbine 66 is heat exchanged at 18 with the starting methane mentioned before.

In an alternative process heat is recovered from the raw synthesis gas leaving combustor 10 in a boiler raising steam at 120 bar abs, which is then let down to 12 bar abs in a turbine and used mainly as feed to point 16, partly in a condensing turbine. Since the raw synthesis gas is at a higher pressure, its dewpoint is higher, sufficient to heat a low pressure boiler providing steam for methanol distillation. At the same time the steam 44 raised in methanol synthesis is let down to 3.5 bar abs in a turbine, to supply compressor power and low pressure steam for methanol distillation.

The nett efficiency of the two processes is respectively 307 and 314 therms per metric ton, which is to be compared with about 340 for a corresponding process without cooling by the catalytic steam/methane reaction in the combustor. The new processes have an advantage in simplicity over such a corresponding process in that no carbon dioxide removal step is needed.

It will be appreciated that the sources of power mentioned for machines 34, 54 and 60 are by way of example only, and that in practice the powering of these machines and others would be designed in an integrated way on the basis of gas engines and steam engines and direct and electric drives.

In a typical process according to the invention for producing 1000 metric tons per day the gas compositions and flow rates are as shown in the Table.

When such a process is operated as shown in the flow-sheet, part of the energy recovery from hot process gases is by expansion in turbine 24, from 10.6 to 1.1 bar abs., part by raising steam at 40 bar abs. pressure at 26 and 44 and (apart from what is used at 16) letting it down to condensing at 0.1 bar abs. Owing to the low pressure after the expansion turbine, the dew point of the gas is only 95° C., hence useful heat cannot be recovered from it sufficient for methanol distillation, and some heat has to be imported.

As a further alternative, the gas leaving the expansion turbine can be cooled by heat exchange with hydrocarbon and steam to be fed to combustor 10, then with hydrocarbon to be hydrodesulphurised, then by direct contacting with cold water, whereby to produce a hot water stream to be used in a saturator providing the hydrocarbon/steam mixture.

TABLE

| Position | Temp. °C. | Press. bar abs | Gas composition mol % | | | | | | | | Flow rate kg mol h$^{-1}$ |
|---|---|---|---|---|---|---|---|---|---|---|---|
| | | | CO | CO$_2$ | H$_2$ | CH$_4$ | N$_2$ | H$_2$O | CH$_3$OH | O$_2$ | |
| 12 | 260 | 13.8 | — | — | — | — | 0.5 | — | — | 99.5 | 854 |
| 14 | 427 | 13.8 | — | — | — | 99.5 | 0.5 | — | — | — | 1070 |
| 16 + 17 | 350 | 12.0 | — | — | — | — | — | 100 | — | — | 2777 |
| 20 | 427 | 13.8 | — | — | — | 99.5 | 0.5 | — | — | — | 436 |
| 22 inlet | 1200 | 12.0 | 11.1 | 4.5 | 24.4 | 8.3 | 0.2 | 51.4 | — | — | 6247 |
| 22 outlet | 858 | 10.6 | 12.1 | 8.0 | 44.5 | 0.87 | 0.16 | 34.4 | — | — | 7166 |
| 24 outlet | 555 | 1.1 | 12.1 | 8.0 | 44.5 | 0.87 | 0.16 | 34.4 | — | — | 7166 |
| 34 outlet | 40 | 50.0 | 18.4 | 12.2 | 67.8 | 1.33 | 0.24 | — | — | — | 4701 |
| 50 | 35 | 48 | 0.1 | 1.4 | 0.4 | 0.2 | — | 26.7 | 71.4 | — | 1853 |
| 58 inlet | 35 | 48 | 9.0 | 13.9 | 59.4 | 14.7 | 2.9 | 0.1 | — | — | 395 |
| 60 inlet | 35 | 3.5 | 17.3 | 26.3 | 22.6 | 28.2 | 5.4 | 0.1 | — | — | 287 |
| 66 outlet | 468 | 1.1 | — | 4.1 | — | — | 75.7 | 4.5 | — | — | 3261 |

We claim:
1. In a continuous process of producing a gas stream comprising hydrogen and carbon oxides having a ratio R in the range 1.5 to 2.22 where R is defined as

$$R = \frac{H_2 - CO_2}{CO + CO_2}$$

where $H_2$, $CO$, and $CO_2$ represent the number of moles of these gases in said gas stream, by the steps of (a) reacting a normally gaseous hydrocarbon feedstock with oxygen, the proportion of oxygen being less than sufficient for complete combustion, but sufficient to avoid substantial by-product carbon formation, whereby a hot gas stream at a temperature in the range 1093°–1260° C. is produced;

(b) mixing a further amount of said normally gaseous hydrocarbon into said hot gas stream;

(c) reacting the whole of the resulting gas mixture adiabatically over a steam reforming catalyst comprising a Group VIII metal on a heat resistant support, whereby to increase the ratio R from that of said hot gas and to decrease the temperature of the gas mixture to give a product gas at a temperature in the range 750°–950° C. and at a pressure in the range 5 to 50 bar abs.;

the improvement whereby a compressed gas stream that is suitable for methanol synthesis at a pressure in the range 20 to 120 bar abs. is provided by (i) in step (b) adding steam as well as said further hydrocarbon to said hot gas stream whereby the product gas produced in step (c) contains unreacted steam;

(ii) cooling the product gas produced in step (c) by expansion in a turbine;

(iii) cooling the expanded gas produced in step (ii) further and separating water, but not carbon dioxide, therefrom; and (iv) compressing the resultant water-depleted gas to said methanol synthesis pressure in a compressor powered by said turbine.

2. A process according to claim 1 wherein the reaction of the normally gaseous hydrocarbon feedstock and oxygen is effected in a combustion zone of a reactor, said combustion zone having a substantially uniform cross-section bounded by, in order, a layer of steam providing at least part of the steam added to the hot gas, a perforated inner shell through which the steam of that layer is fed, then a further layer of steam, then an external containing wall, and the catalyst is disposed in said reactor and occupies therein a reaction zone having at its downstream end a cross-sectional area between one-half and twice the cross-sectional area of said combustion zone.

3. A process according to claim 1 wherein steam is generated by heat recovery from the turbine effluent gas and is fed to a second turbine which also powers the compressor.

4. A process according to claim 1 in which the catalyst is in monolithic form having through-passages generally parallel to the direction of flow of gas mixture.

5. A process according to claim 1 in which the catalyst is in the form of random-packed units each affording gas flow in at least two mutually transverse directions within its boundaries.

* * * * *